United States Patent
Li et al.

(10) Patent No.: US 11,786,892 B2
(45) Date of Patent: Oct. 17, 2023

(54) CATALYST STRUCTURE AND ELECTROCHEMICAL DEVICE

(71) Applicant: NATIONAL CHUNG CHENG UNIVERSITY, Chiayi (TW)

(72) Inventors: Yuan-Yao Li, Chia-Yi County (TW); Ta-En Ko, Yunlin County (TW)

(73) Assignee: NATIONAL CHUNG CHENG UNIVERSITY, Chiayi (TW)

(*) Notice: Subject to any disclaimer, the term of this patent is extended or adjusted under 35 U.S.C. 154(b) by 0 days.

(21) Appl. No.: 17/394,423

(22) Filed: Aug. 5, 2021

(65) Prior Publication Data

US 2022/0297102 A1  Sep. 22, 2022

(30) Foreign Application Priority Data

Mar. 16, 2021 (TW) .................. 110109444

(51) Int. Cl.

| | |
|---|---|
| *B01J 21/18* | (2006.01) |
| *B01J 23/75* | (2006.01) |
| *B01J 23/755* | (2006.01) |
| *B01J 35/00* | (2006.01) |
| *B01J 35/04* | (2006.01) |
| *C25B 11/065* | (2021.01) |
| *C25B 1/02* | (2006.01) |
| *C25B 1/50* | (2021.01) |
| *B01J 37/02* | (2006.01) |

(52) U.S. Cl.
CPC ......... *B01J 35/0006* (2013.01); *B01J 21/185* (2013.01); *B01J 23/75* (2013.01); *B01J 23/755* (2013.01); *B01J 35/04* (2013.01); *B01J 37/0217* (2013.01); *C25B 1/02* (2013.01); *C25B 1/50* (2021.01); *C25B 11/065* (2021.01)

(58) Field of Classification Search
CPC ........ B01J 21/185; B01J 23/75; B01J 23/755; B01J 35/0006; B01J 35/04; C25B 11/065; C25B 1/02; C25B 1/50
See application file for complete search history.

(56) References Cited

U.S. PATENT DOCUMENTS

| | | | |
|---|---|---|---|
| 8,951,632 B2* | 2/2015 | Shah | B01J 23/75 977/750 |
| 9,082,524 B2* | 7/2015 | Worsley | C04B 35/532 |
| 9,114,377 B2* | 8/2015 | Swager | B01J 27/02 |
| 10,391,475 B2* | 8/2019 | Yu | H01M 4/96 |
| 10,789,419 B2* | 9/2020 | Upadhyay | H04L 51/046 |
| 11,224,859 B2* | 1/2022 | Rong | B01J 35/0086 |
| 2019/0062164 A1* | 2/2019 | Odeh | B01J 21/185 |

* cited by examiner

*Primary Examiner* — Cam N. Nguyen
(74) *Attorney, Agent, or Firm* — CKC & Partners Co., LLC

(57) ABSTRACT

A catalyst structure is provided. The catalyst structure includes a porous carrier and a plurality of layered hydroxides. The porous carrier includes a nitrogen-doped carbon framework, a plurality of metal oxide particles and a plurality of carbon nanotubes. The nitrogen-doped carbon framework has a plurality of pores. The metal oxide particles are uniformly dispersed in the pores of the nitrogen-doped carbon framework. The carbon nanotubes are located on a surface of the nitrogen-doped carbon framework, and one end of each of the carbon nanotubes is connected to the surface of the nitrogen-doped carbon framework. The layered hydroxides are coated on the surface of the nitrogen-doped carbon framework.

9 Claims, 8 Drawing Sheets
(1 of 8 Drawing Sheet(s) Filed in Color)

CATALYST STRUCTURE AND ELECTROCHEMICAL DEVICE

RELATED APPLICATIONS

This application claims priority to Taiwan Application Serial Number 110109444, filed Mar. 16, 2021, which is herein incorporated by reference.

BACKGROUND

Technical Field

The present disclosure relates to a catalyst structure, a use thereof and an electrochemical device. More particularly, the present disclosure relates to a catalyst structure that coats layered hydroxides on a carbonized metal-organic framework, a use thereof and an electrochemical device.

Description of Related Art

Nowadays, with the development of economy, the energy crisis has become more and more serious, and the environmental problems caused by the use of fossil fuels have affected the survival of human beings. Therefore, it is very important to develop and use the green and renewable new energy sources, in particular, the energy storages and the hydrogen production technologies have been attracted the great attention.

Although renewable energy has many advantages, the catalysts used in an oxygen reduction reaction (ORR), an oxygen evolution reaction (OER) and a hydrogen evolution reaction (HER) have the sluggish kinetics, so that has been greatly restricted in the actual applications. The current research has pointed out that the noble metal catalysts show the great activity for ORR, OER and HER, but the noble metal catalysts have the disadvantages of high cost, rarity and poor stability. Therefore, the development of the high-activity, stable and low cost non-noble metal catalysts (such as metal peroxides or transition metal oxides) is very important.

In recent years, inorganic layered materials composed of transition metal have the metal action vacancies owing to d-orbital distribution and multiple electrons can efficiently motivate the desired electrocatalytic performance, and the composite metal will generate the synergistic effect, so that it has the potential as an electrocatalyst. However, the excessive polymerization and the low conductivity of inorganic layered materials composed of transition metal is a problem that needs to be solved at present.

Therefore, how to develop a catalyst with excellent electrocatalytic performance, and can be applied to variety of electrochemical technologies, which is the goal of the relevant industry.

SUMMARY

According to one aspect of the present disclosure, a catalyst structure is provided. The catalyst structure includes a porous carrier and a plurality of layered hydroxides. The porous carrier includes a nitrogen-doped carbon framework, a plurality of metal oxide particles and a plurality of carbon nanotubes. The nitrogen-doped carbon framework has a plurality of pores. The metal oxide particles are uniformly dispersed in the pores of the nitrogen-doped carbon framework. The carbon nanotubes are located on a surface of the nitrogen-doped carbon framework, and one end of each of the carbon nanotubes is connected to the surface of the nitrogen-doped carbon framework. The layered hydroxides are coated on the surface of the nitrogen-doped carbon framework.

According to another aspect of the present disclosure, a use of the catalyst structure according to the aforementioned aspect is provided, which is used to catalyze an electrochemical energy transformation reaction.

According to further another aspect of the present disclosure, an electrochemical device is provided. The electrochemical device includes the catalyst structure according to the aforementioned aspect.

BRIEF DESCRIPTION OF THE DRAWINGS

The patent or application file contains at least one drawing executed in color. Copies of this patent or patent application publication with color drawing(s) will be provided by Office upon request and payment of the necessary fee. The present disclosure can be more fully understood by reading the following detailed description of the embodiment, with reference made to the accompanying drawings as follows.

DETAILED DESCRIPTION

The present disclosure will be further exemplified by the following specific embodiments. However, the embodiments can be applied to various inventive concepts and can be embodied in various specific ranges. The specific embodiments are only for the purposes of description, and are not limited to these practical details thereof.

A Catalyst Structure

Figure 1:
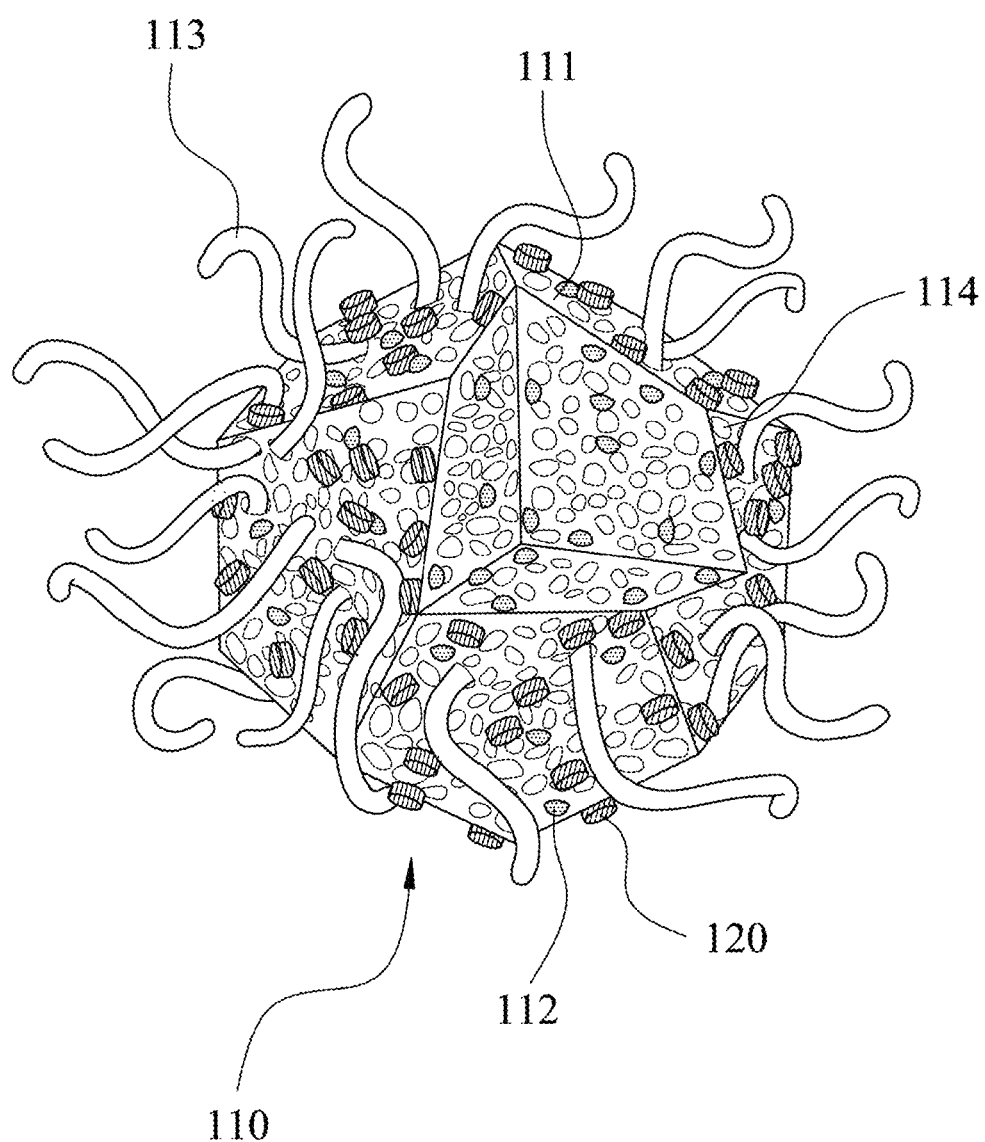
FIG. 1 is a partial cross-sectional view diagram of a catalyst structure according to one embodiment of the present disclosure.

Please refer to FIG. 1, which is a partial cross-sectional view diagram of a catalyst structure 100 according to one embodiment of the present disclosure. As shown in FIG. 1, the catalyst structure 100 includes a porous carrier 110 and a plurality of layered hydroxides 120. The porous carrier 110 includes a nitrogen-doped carbon framework 111, a plurality of metal oxide particles 112 and a plurality of carbon nanotubes 113. A carbon content in the nitrogen-doped carbon framework 111 can be 50 wt % to 90 wt %, a nitrogen content in the nitrogen-doped carbon framework 111 can be 1 wt % to 20 wt %, and a size of the nitrogen-doped carbon framework 111 can be 100 nm to 5 μm. The nitrogen-doped carbon framework 111 has a plurality of pores 114. The metal oxide particles 112 are uniformly dispersed in the pores 114 of the nitrogen-doped carbon framework 111. A content of the metal oxide particles 112 can be 5 wt % to 40 wt %, and a particle size of each of the metal oxide particles 112 can be 0.5 nm to 50 nm. The carbon nanotubes 113 are located on a surface of the nitrogen-doped carbon framework 111, and one end of each of the carbon nanotubes 113 is connected to the surface of the nitrogen-doped carbon framework 111. A length of each of the carbon nanotubes 113 can be 10 nm to 2 μm, and a diameter of each of the carbon nanotubes can be 1 nm to 30 nm. The layered hydroxides 120 are coated on the surface of the nitrogen-doped carbon framework 111, wherein a thickness of each of the layered hydroxides 120 can be 0.5 nm to 50 nm, and a content of the layered hydroxides 120 can be 2 wt % to 20 wt %.

Specifically, the porous carrier 110 of the present disclosure is prepared from the metal organic frameworks (MOFs) with the method of carbonization in the inert environment and reoxidation in the air environment. The common metal organic framework is the zeolitic imidazolate framework (ZIF), which is a tetrahedral frame structure formed by an organic ligand of the imidazole series linked to a transition metal, so it contains carbon, nitrogen and metal components. The metal organic framework has the high surface area, the high pore structure and the stability, and the derived compound of the metal organic framework has a controllable structure, which can be used as an excellent electrode material.

The present disclosure uses ZIF-8 containing metallic zinc combined with ZIF-67 containing metallic cobalt as the metal organic framework, and after carbonization, oxidation and heat treatment, the carbon skeleton structure doped with the nitrogen, the metal oxide particles 112 and the carbon nanotubes 113 is prepared. The metal oxide particles 112 can be cobalt tetroxide, which is used as the catalyst and dispersed in the nitrogen-doped carbon framework 111. The nitrogen atom can effectively enhance the catalytic performance of the carbon framework, which can provide the high-density active sites and regulate the charge density of the carbon framework. The carbon nanotubes 113 are formed by the interaction of the cobalt nanoparticles and carbon during the heat treatment process, which can improve the conductivity. Therefore, the porous carrier 110 of the present disclosure has the great conductivity and the dispersive structure, which enables the material to have more active sites, so as to improve the catalytic effect of the catalyst.

Furthermore, the layered hydroxides 120 of the present disclosure is obtained by the co-precipitation and the heat treatment which makes the precursor of layered hydroxides soak into the porous carrier 110, so that the layered hydroxides 120 are coated on the surface of the nitrogen-doped carbon framework 111, which are not affect the state of the metal oxide particles 112 in the nitrogen-doped carbon framework 111. For example, the layered hydroxides 120 of the present disclosure can be nickel-iron layered hydroxides, so the cations $Ni^{2+}$ and $Fe^{3+}$ are introduced as the precursors into the porous carrier 110, and NiFe-LDH is grown on the heterogeneous sites of the porous carrier 110. Therefore, NiFe-LDH can increase the surface active sites and ion exchange rate on the porous carrier 110, and can greatly improve the conductivity and the catalytic effect of the catalyst. However, the type of the layered hydroxides 120 is not limited to the disclosure, and the different type of the layered hydroxide catalyst can be selected according to different application fields.

According to the above, the catalyst structure 100 of the present disclosure uses the porous nitrogen-doped carbon framework 111 to improve the mass transfer efficiency of the metal oxide particles 112, and the distribution of the carbon nanotubes 113 can improve the graphitization and the conductivity of the carbon fiber. Furthermore, the layered hydroxides 120 can improve the ion exchange rate. Hereafter, the catalyst structure 100 is represented by NiFe-LDH-CNT-$Co_3O_4$/NC, wherein the porous carrier 110 is represented by CNT-$Co_3O_4$/NC, and the layered hydroxides 120 are represented by NiFe-LDH.

A Use of Catalyst Structure

The use of the aforementioned catalyst structure is provided of the present disclosure, wherein the catalyst structure is used to catalyze an electrochemical energy transformation reaction. The electrochemical energy transformation reaction can be an oxygen reduction reaction (ORR), an oxygen evolution reaction (OER), a hydrogen evolution reaction (HER) and a carbon dioxide reduction reaction ($CO_2RR$). The reaction mechanisms of the oxygen reduction reaction, the oxygen evolution reaction, the hydrogen evolution reaction and the carbon dioxide reduction reaction are conventional art and will not be further described herein.

Electrochemical Device

The electrochemical device is provided of the present disclosure, wherein the electrochemical device includes the aforementioned catalyst structure. Specifically, when the catalyst structure has excellent performance in ORR and OER, the applied electrochemical device can be a metal-air battery or an alkaline fuel-cell. Furthermore, when the catalyst structure has excellent performance in OER and HER, the applied electrochemical device can be a water splitting device. Therefore, the catalyst structure of the present disclosure can be used in the energy industry widely. The metal-air battery, the alkaline fuel-cell and the water splitting device are conventional art and will not be further described herein.

The present disclosure will be further exemplified by the following specific embodiments so as to facilitate utilizing and practicing the present disclosure completely by the people skilled in the art without over-interpreting and over-experimenting. However, the readers should understand that the present disclosure should not be limited to these practical details thereof, that is, these practical details are used to describe how to implement the materials and methods of the present disclosure and are not necessary.

Synthesis Method of ZIF-67/ZIF-8

First, 4.36 g of cobalt nitrate hexahydrate ($Co(NO_3)_2 \cdot 6H_2O$) and 150 mL of methanol ($CH_3OH$) solvent are mixed uniformly to prepare solution A. Next, 9.85 g of 2-methylimidazole ($C_4H_6N_2$) is dissolved in 150 mL of methanol solvent to prepare solution B. Then, the solution A is poured into the solution B quickly. The mixture is stirred for 30 minutes and aged for 12 hours at the room temperature. The solid product ZIF-67 is collected by the centrifugation with 14900 rpm and dried at 80° C.

Furthermore, 0.2 g of ZIF-67 is added in 30 mL of methanol and mixed for 10 minutes to prepare solution C. Then, 0.3 g of zinc nitrate hexahydrate ($Zn(NO_3)_2 \cdot 6H_2O$) dissolved in 15 mL of methanol solvent is added into the solution C with 2-methylimidazole simultaneously, and stirred for 12 hours. The solid product ZIF-67/ZIF-8 is collected by the centrifugation with 14900 rpm and dried at 80° C.

Synthesis Method of NiFe-LDH-CNT-$Co_3O_4$/NC

First, the synthesized ZIF-67/ZIF-8 is annealed at 800° C. for 5 hours with a ramping rate of 2° C./min in the nitrogen environment. After cooling, the black powders are formed is CNT-Co/NC. Next, the synthesized CNT-Co/NC is placed into a muffle furnace and oxidized at 250° C. in the air environment for 40 minutes with ramping rate of 1° C./min to obtain CNT-$Co_3O_4$/NC porous carrier.

Furthermore, two metal salts of $Fe(NO_3)_2$ and $Ni(NO_3)_2$ with a weight ratio of 1.789 and CNT-$Co_3O_4$/NC are added to ammonia water as precursor for co-precipitation to heat at 100° C. for 6 hours in the alkaline environment (pH=14) to precipitate cations at the stirring rate of 550 to 850 rpm, so that NiFe-LDH is growth on the surface of CNT-$Co_3O_4$/NC to obtain NiFe-LDH-CNT-$Co_3O_4$/NC catalyst structure of the present disclosure.

Analysis of Properties of NiFe-LDH-CNT-$Co_3O_4$/NC

Figure 2A:
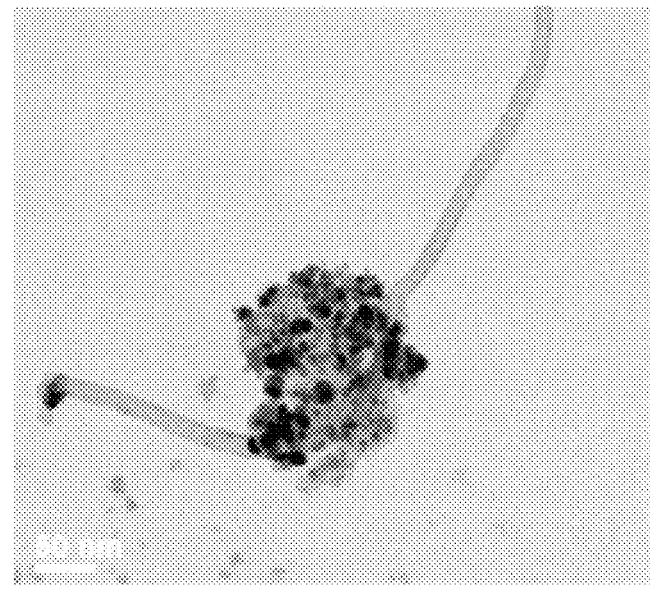
FIG. 2A is a low-resolution TEM image of Example 1.
Figure 2B:
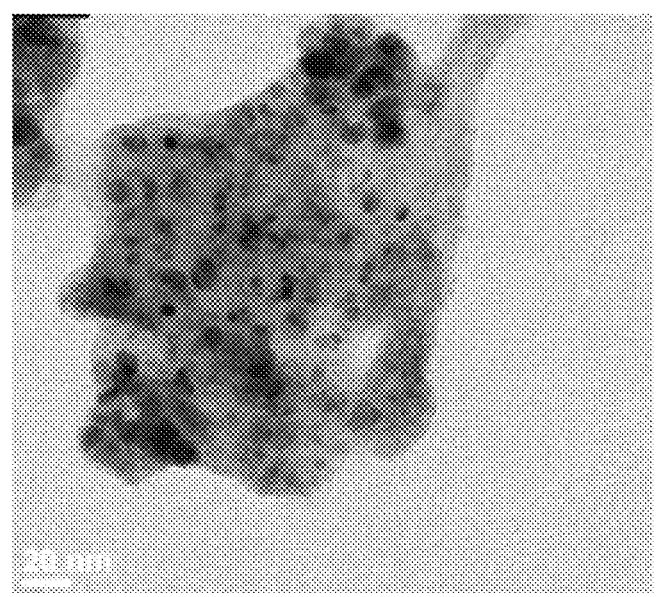
FIG. 2B is a high-resolution TEM image of Example 1.
Figure 3:
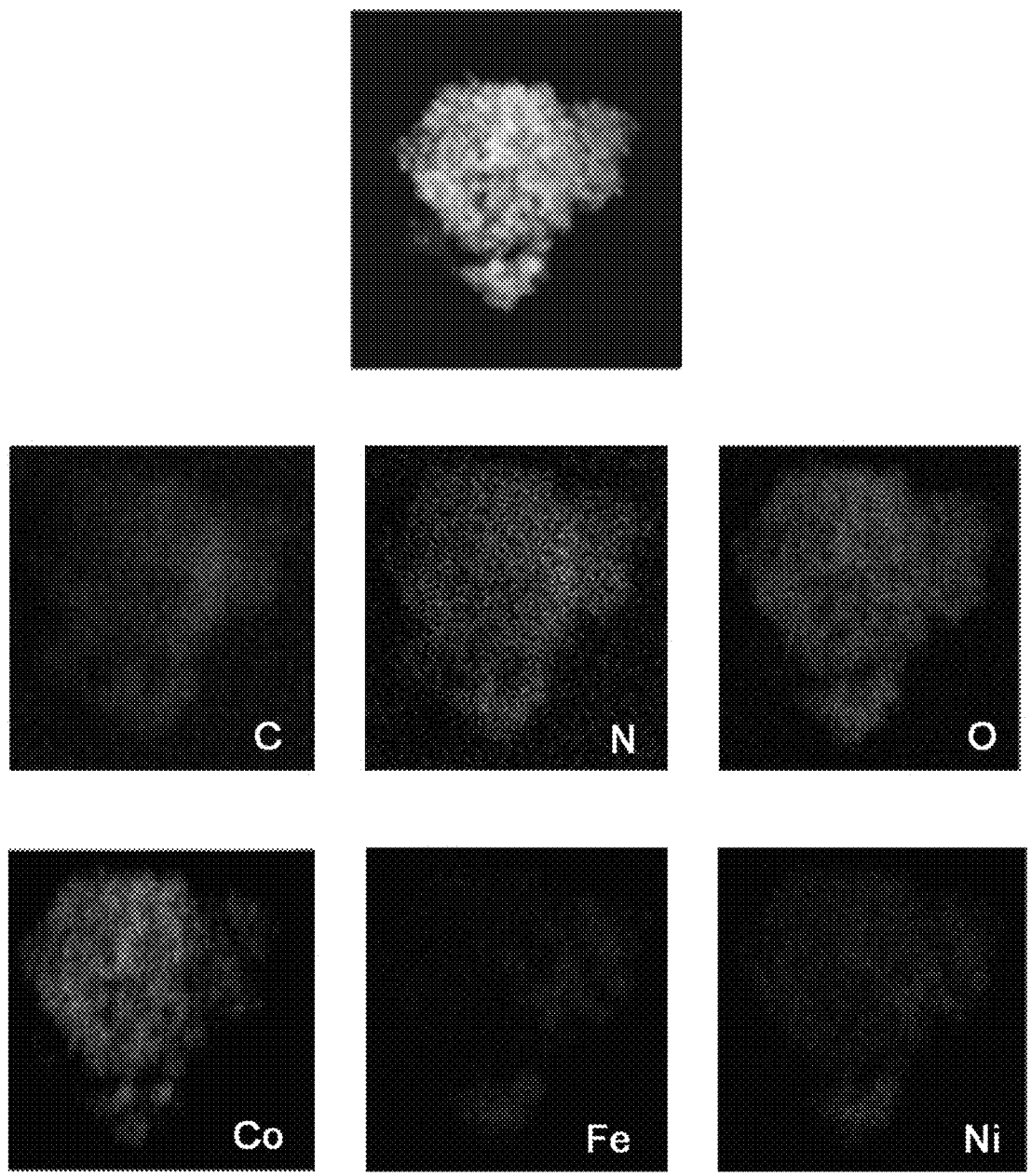
FIG. 3 is an EDS energy dispersion spectrum of Example 1.

Please refer to FIG. 2A, FIG. 2B and FIG. 3, wherein FIG. 2A is a low-resolution TEM image of Example 1, FIG. 2B is a high-resolution TEM image of Example 1 and FIG. 3 is an EDS energy dispersion spectrum of Example 1. Example 1 is a NiFe-LDH-CNT-$Co_3O_4$/NC catalyst structure. As shown in FIG. 2A and FIG. 2B, the nitrogen-doped carbon framework of Example 1 is a 3D porous structure with the size of about 150 nm to 200 nm, the $Co_3O_4$ nanoparticles are uniformly dispersed on the nitrogen-doped carbon framework, and NiFe-LDH is grown on the nitrogen-doped carbon framework with the thickness of 1 nm to 5 nm.

Furthermore, in FIG. 3, C, N, O, Co are the elements of CNT-$Co_3O_4$/NC of Example 1, it can be seen that the CNT-$Co_3O_4$/NC porous carrier is distributed in the core of the catalyst structure. Fe and Ni are the elements of NiFe-LDH of Example 1, it can be seen that NiFe-LDH is coated on the outside of the core. In addition, the percentages by weight of Ni, Fe, Co measured by the inductively coupled plasma mass spectrometry (ICP-MS) are 4.68 wt %, 2.63 wt % and 14.04 wt %, respectively. It can be seen that NiFe-LDH is coated on the surface of nitrogen-doped carbon framework of CNT-$Co_3O_4$/NC certainly, and the weight ratio of Fe to Ni is 1.78, which is in line with the prepared amount.

Figure 4:
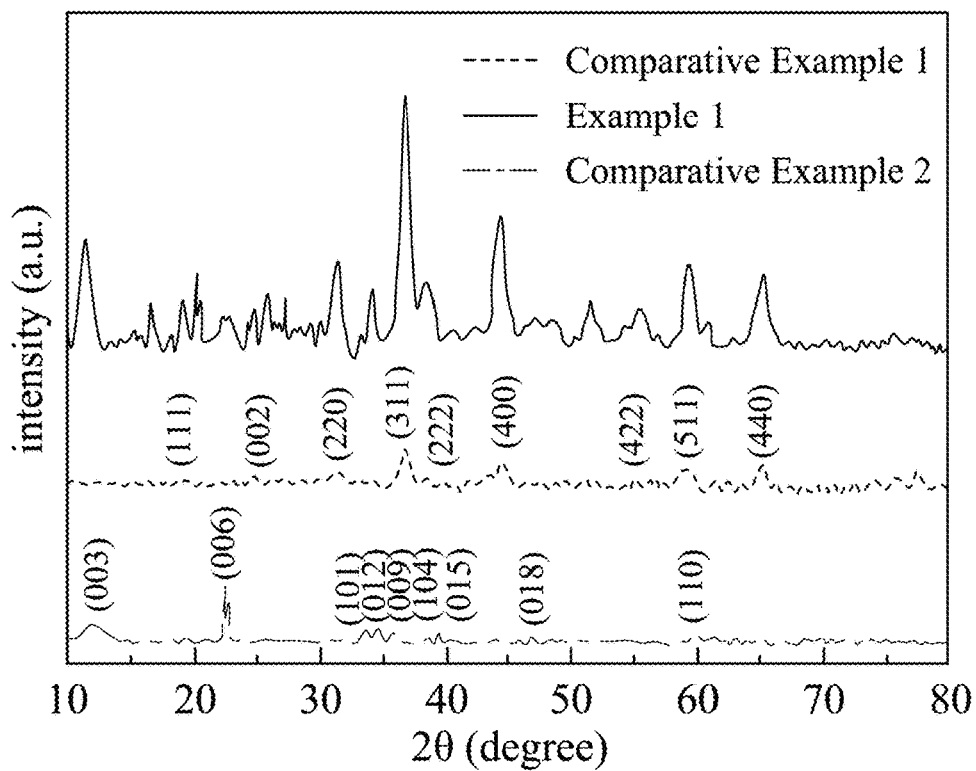
FIG. 4 is an XRD pattern of Example 1 and Comparative Example 1 to Comparative Example 2.

Please refer to FIG. 4, which is an XRD pattern of Example 1 and Comparative Example 1 to Comparative Example 2, wherein Comparative Example 1 is CNT-$Co_3O_4$/NC and Comparative Example 2 is NiFe-LDH. As shown in FIG. 4, the characteristic peaks of Comparative Example 1 are consistent with the cubic spinel $Co_3O_4$/NC phase (JCPDS card no 43-1003), and the characteristic peaks of Comparative Example 2 are consistent with the hydrotalcite-like NiFe-LDH phase (JCPDS card no 49-0188). Therefore, in the characteristic peaks of Example 1, 2θ at 19°(111), 31.29°(220), 36.84°(311), 38.54°(222), 44.80°(400), 55.65° (422), 59.35°(511) and 65.23°(440) are represented the crystalline phase of CNT-$Co_3O_4$/NC, and 2θ at 11.8°(003), 23.8°(006), 34.1°(101), 34.7°(012), 35.9°(009), 37.6°(104), 39.3°(015), 47°(018) and 60.3°(110) are represented the crystalline phase of NiFe-LDH. It can be confirmed that Example 1 is NiFe-LDH-CNT-$Co_3O_4$/NC catalyst structure. Furthermore, the increase in the intensity of the characteristic peaks of Example 1 is due to the excellent coupling interaction between CNT-$Co_3O_4$/NC and NiFe-LDH. When 2θ is at 34.1°(101), it is NiCOOH crystal phase, and when 2θ is at 37.6°(104), it is a-$Fe_2O_3$ crystal phase. The peak intensities of the above two characteristic peaks are relatively small, indicating that in NiFe-LDH-CNT-$Co_3O_4$/NC catalyst structure, NiFe-LDH is a high pure phase LDH layer.

Figure 5:
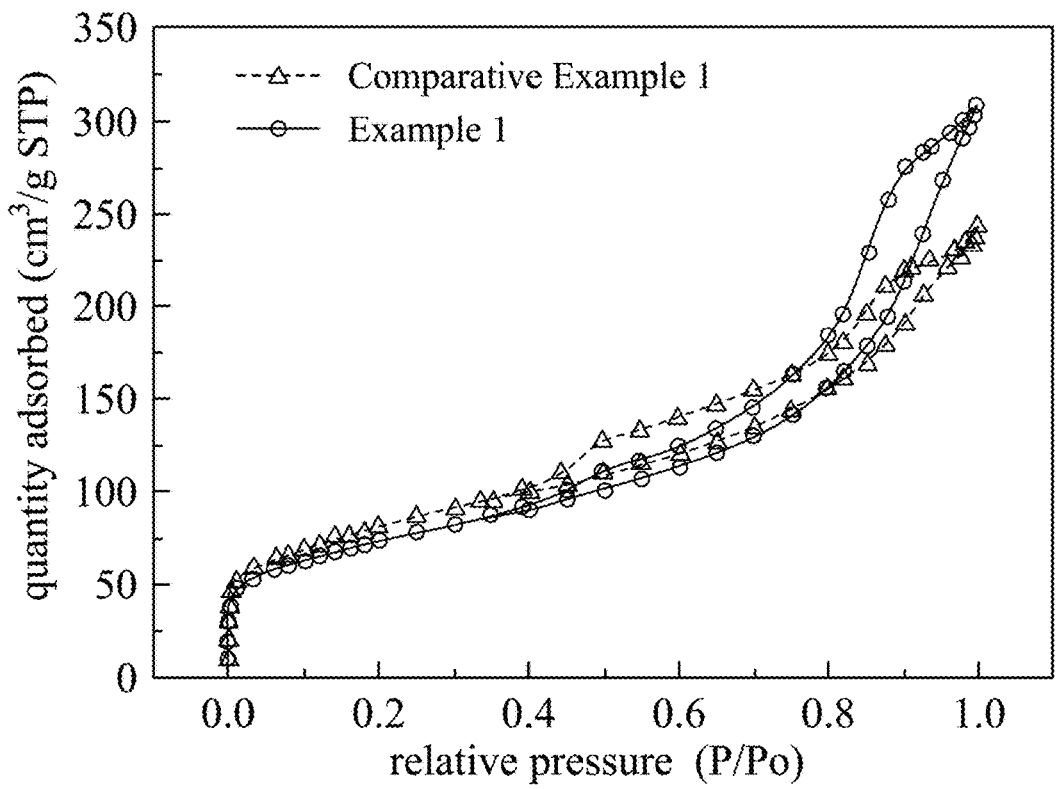
FIG. 5 is a curve diagram of $N_2$ isotherm adsorption/desorption of Example 1 and Comparative Example 1.

Please refer to FIG. 5, which is a curve diagram of $N_2$ isotherm adsorption/desorption of Example 1 and Comparative Example 1, and from the curve of isotherm adsorption/desorption, the specific surface area ($S_{BET}$) and the pore size ($d_p$) of Example 1 and Comparative Example 1 can be calculated, which is shown in Table 1. As shown the results of Table 1, the specific surface area of Example 1 is less than that of Comparative Example 1, but Example 1 provides a larger pore size. Therefore, coating NiFe-LDH on the surface of CNT-$Co_3O_4$/NC will reduce the specific surface area of CNT-$Co_3O_4$/NC, so that the formed NiFe-LDH-CNT-$Co_3O_4$/NC has a variety of way to promote ion exchange and enhance the contact area between the electrolyte and the electrode to improve the electrochemical performance.

TABLE 1

|  | $S_{BET}$ (m²/g) | $d_p$ (nm) |
| --- | --- | --- |
| Example 1 | 393.99 | 7.785 |
| Comparative Example 1 | 436.03 | 3.1099 |

ORR Measurement

The ORR measurement of the present disclosure is under the saturated $O_2$ solution condition, the catalyst of Example 1 and Comparative Example 1 to Comparative Example 4 are used as a working electrode and placed on the rotating ring disk electrode (RRDE), wherein the electrolyte is 0.1 M potassium hydroxide (KOH), the rotating speed is 1600 rpm, and the scanning rate is 5 mV/s to perform the linear sweep voltage (LSV) test. Comparative Example 3 is 20 wt % Pt/C, and Comparative Example 4 is CNT-Co/NC.

Figure 6:
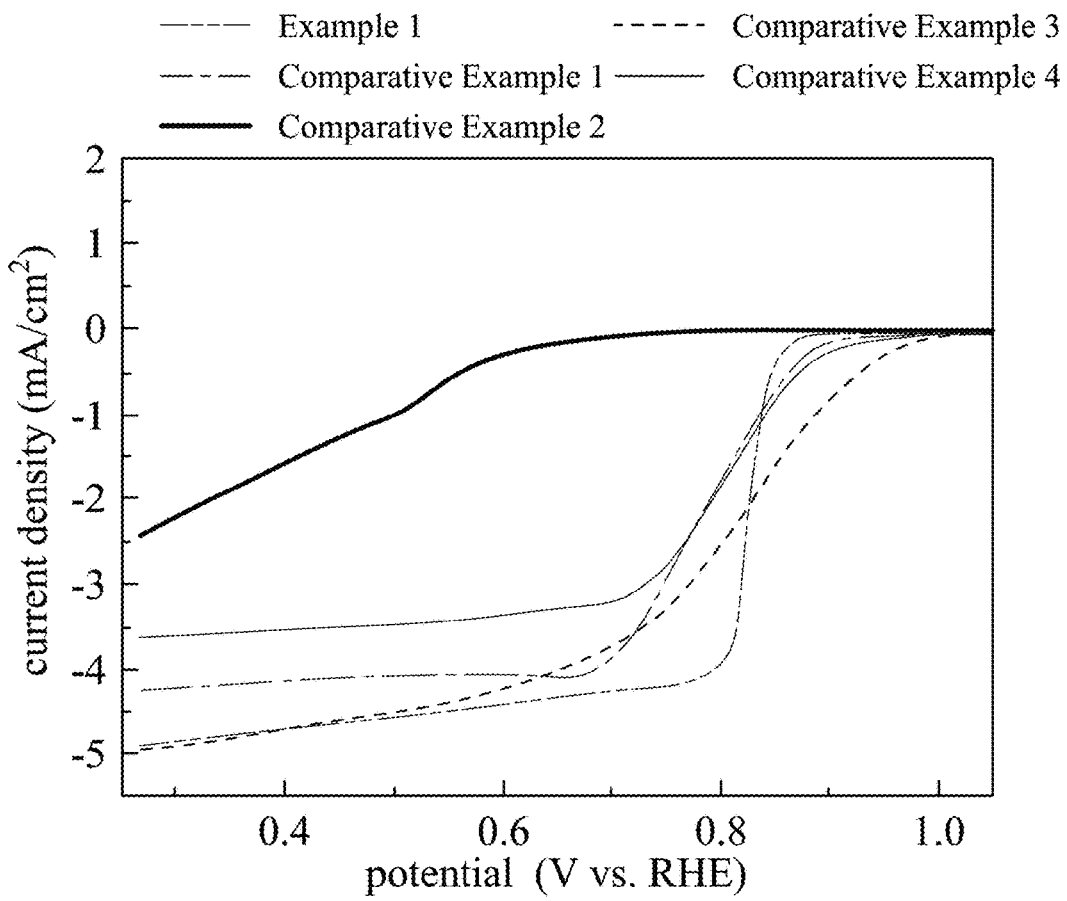
FIG. 6 is a linear sweep voltammogram of ORR of Example 1 and Comparative Example 1 to Comparative Example 4.

Please refer to FIG. 6, which is a linear sweep voltammogram of ORR of Example 1 and Comparative Example 1 to Comparative Example 4, wherein the horizontal axis is the potential (V) relative to reversible hydrogen electrode (RHE). The onset potential, the half-wave potential and the limited current density of Example 1 and Comparative Example 3 are listed in Table 2. As shown in FIG. 6 and Table 2, the half-wave potential of Example 1 is 0.84 V, which is higher than that of Comparative Example 3 with the noble metal, it is indicated that the oxygen reduction activity of Example 1 is higher. Furthermore, according to the half-wave potential of Example 1 and Comparative Example 1, it can be observed that after NiFe-LDH coated on the surface of CNT-$Co_3O_4$/NC, the half-wave potential increases significantly, indicating that NiFe-LDH has an effect on ionic conductivity. In addition, the limited current density of Example 1 and Comparative Example 3 are both the highest, but the tafel slope of Example 1 is 26 mv/dec, which is much lower than 130 mv/dec of Comparative Example 3. The lower the tafel slope, the better the catalytic activity for ORR. Therefore, Example 1 of the present disclosure has the better catalytic activity for oxygen reduction reaction.

TABLE 2

|  | Example 1 | Comparative Example 3 |
|---|---|---|
| The onset potential (V) | 0.884 | 0.982 |
| The half-wave potential (V) | 0.84 | 0.80 |
| The limited current density (mA/cm$^2$) | 4.93 | 4.93 |

Figure 7:
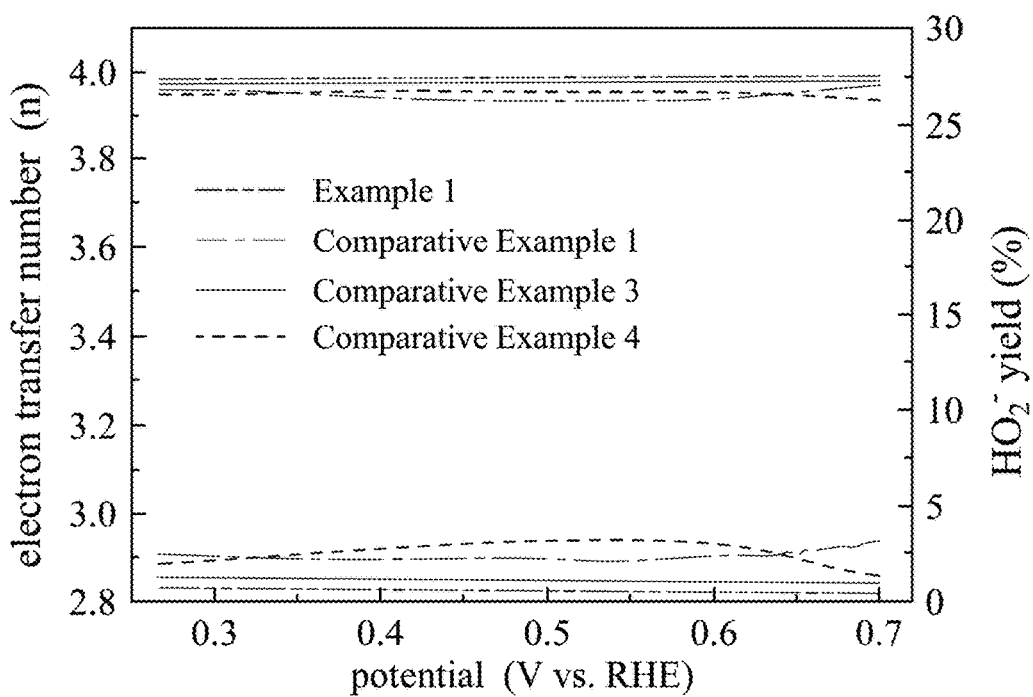
FIG. 7 is a diagram of the relationship between the electron transfer number and hydrogen peroxide yield with the potential of Example 1, Comparative Example 1, Comparative Example 3 and Comparative Example 4.

Please refer to FIG. 7, which is a diagram of the relationship between the electron transfer number and hydrogen peroxide yield with the potential of Example 1, Comparative Example 1, Comparative Example 3 and Comparative Example 4. The higher the electron transfer number, the better the efficiency of the catalyst to reduce oxygen. Furthermore, the higher the hydrogen peroxide yield ($HO_2^-$) of the intermediate product, it means that the four electrons transfer reaction does not perform to produce water during the oxidation-reduction process, but $HO_2^-$ is produced in the process, so that the reduction effect is poor. As shown the result of FIG. 7, the electron transfer numbers of Example 1, Comparative Example 1, Comparative Example 3 and Comparative Example 4 are all about 3.97 to 3.99, which are close to the theoretical electron transfer number of four electrons. The hydrogen peroxide yield of Example 1 is relatively lower, it can be indicated that Example 1 of the present disclosure has the better catalytic activity for oxygen reduction reaction.

OER Measurement

The OER measurement of the present disclosure is under the saturated $0_2$ solution condition, the catalyst of Example 1, Comparative Example 1, Comparative Example 2, Comparative Example 4 and Comparative Example 5 are placed into the electrolytic cell and used as the working electrode, wherein the electrolyte is 0.1 M potassium hydroxide (KOH), and the scanning rate is 5 mV/s to perform the linear sweep voltage (LSV) test.

Figure 8:
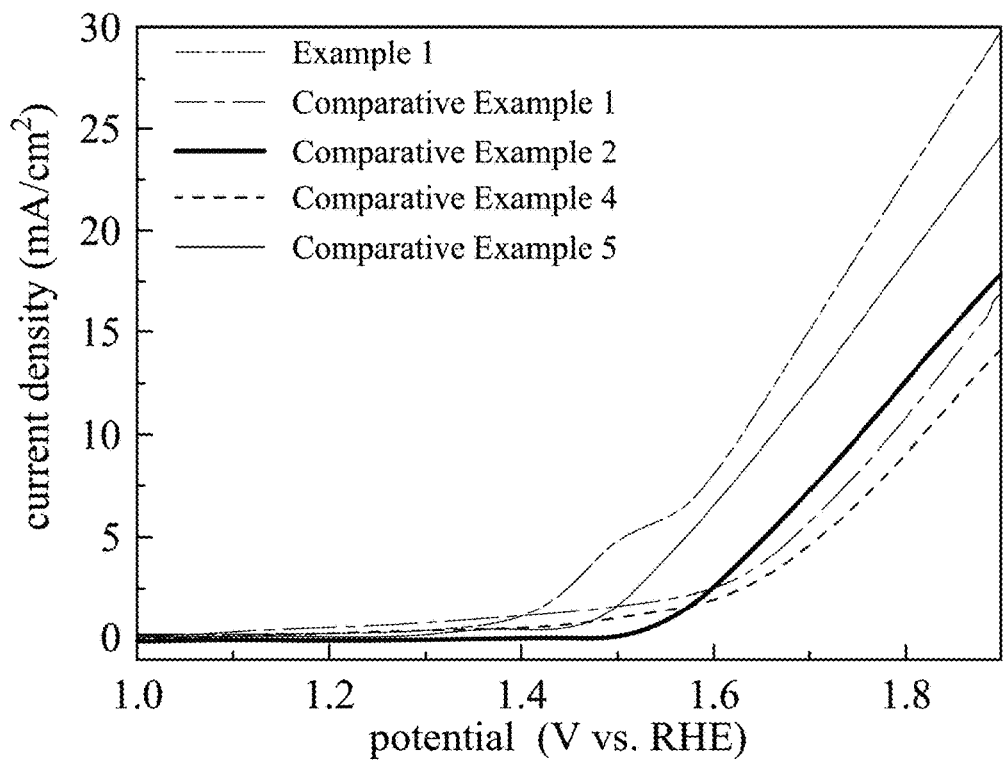
FIG. 8 is a linear sweep voltammogram of OER of Example 1, Comparative Example 1, Comparative Example 2, Comparative Example 4 and Comparative Example 5.
Figure 9:
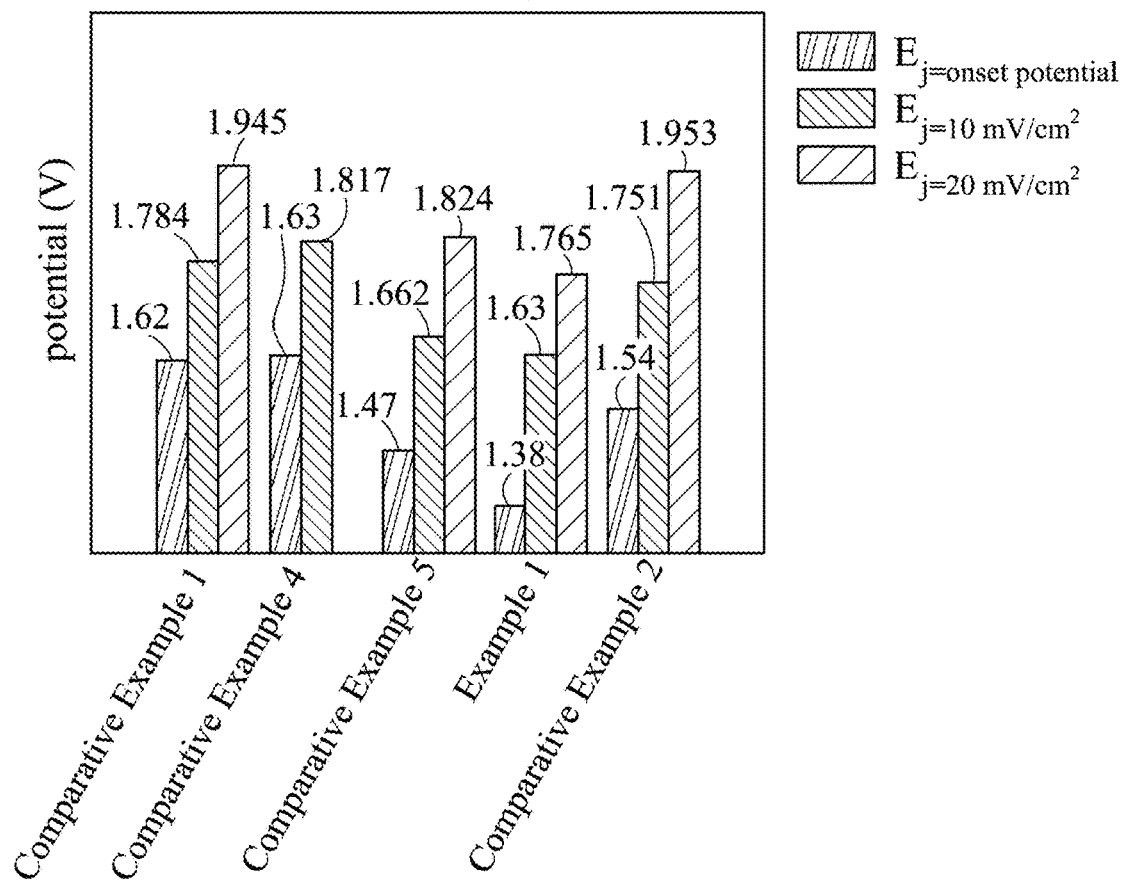
FIG. 9 is a histogram of the onset potential, the potential when the current density is 10 $mA/cm^2$ and 20 $mA/cm^2$ of Example 1, Comparative Example 1, Comparative Example 2, Comparative Example 4 and Comparative Example 5.

Please refer to FIG. 8 and FIG. 9, wherein FIG. 8 is a linear sweep voltammogram of OER of Example 1, Comparative Example 1, Comparative Example 2, Comparative Example 4 and Comparative Example 5. FIG. 9 is a histogram of the onset potential ($E_{j=onset\ potential}$), the potential when the current density is 10 mA/cm$^2$ ($E_{j=10\ mA/cm^2}$) and 20 mA/cm$^2$ ($E_{j=20\ mA/cm^2}$) of Example 1, Comparative Example 1, Comparative Example 2, Comparative Example 4 and Comparative Example 5. Comparative Example 5 is a commercial $RuO_2$. As shown in FIGS. 8-9, Example 1 has the lowest onset potential, and when the current density is 10 mA/cm$^2$ and 20 mA/cm$^2$, Example 1 has the lowest overpotential, which is better than that of Comparative Example 1, Comparative Example 2, Comparative Example 4 and Comparative Example 5 significantly. In addition, the OER performance of Comparative Example 1 and Comparative Example 2 are similar, but after doping Comparative Example 1 with Comparative Example 2, the synergistic effect occurs, which can be indicated that coating NiFe-LDH on the surface of CNT-$Co_3O_4$/NC will increase the ionic conductivity, so as to reduce its overpotential to make Example 1 has excellent catalytic performance. Furthermore, the tafel slope of Example 1 is 136 mv/dec, which is lower than that of Comparative Example 1, Comparative Example 2, Comparative Example 4 and Comparative Example 5. It is indicated that Example 1 of the present disclosure has the better catalytic activity for oxygen evolution reaction.

Figure 10:
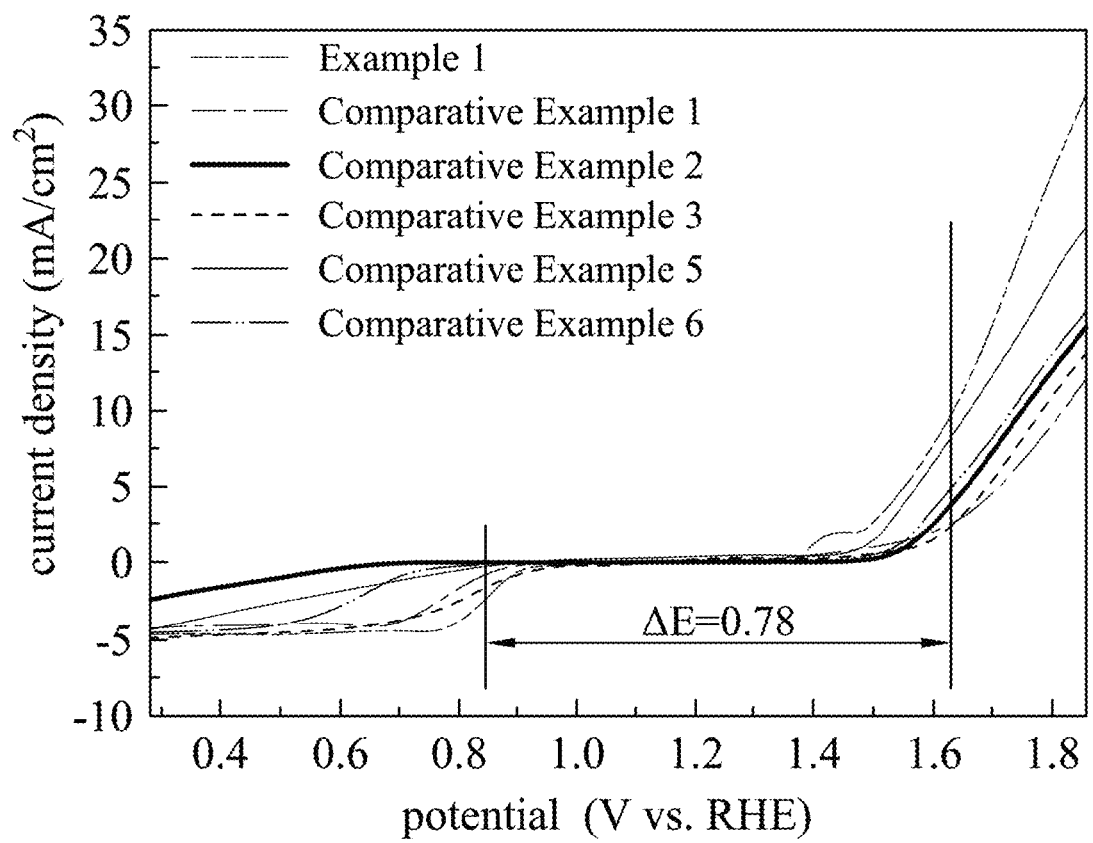
FIG. 10 is a linear sweep voltammogram of ORR and OER of Example 1, Comparative Example 1 to Comparative Example 3 and Comparative Example 5 to Comparative Example 6.

Please refer to FIG. 10, which is a linear sweep voltammogram of ORR and OER of Example 1, Comparative Example 1 to Comparative Example 3 and Comparative Example 5 to Comparative Example 6. Comparative Example 6 is 20 wt % Ir/C. As shown in FIG. 10, the potential difference (ΔE) between OER and ORR of Example 1 is 0.78 V, which is much smaller than the potential difference between OER and ORR of Comparative Example 1 to Comparative Example 3 and Comparative Example 5 to Comparative Example 6. The potential difference (ΔE) is obtained from the potential difference between the current density of –0.25 mA/cm$^2$ and 10 mA/cm$^2$, it can be used to estimate the effectiveness of the bifunctional oxygen electrode catalyst. The excellent bifunctional catalyst has the lower ΔE value, so it can be indicated that Example 1 of the present disclosure has the better catalytic activity for both ORR and OER, and is an excellent bifunctional catalyst.

HER Measurement

The HER measurement of the present disclosure is under the saturated $H_2$ solution condition, the catalyst of Example 1 and Comparative Example 1 to Comparative Example 3 are placed into the electrolytic cell and used as the working electrode, wherein the electrolyte is 1 M potassium hydroxide (KOH), and the scanning rate is 5 mV/s to perform the linear sweep voltage (LSV) test.

Figure 11:
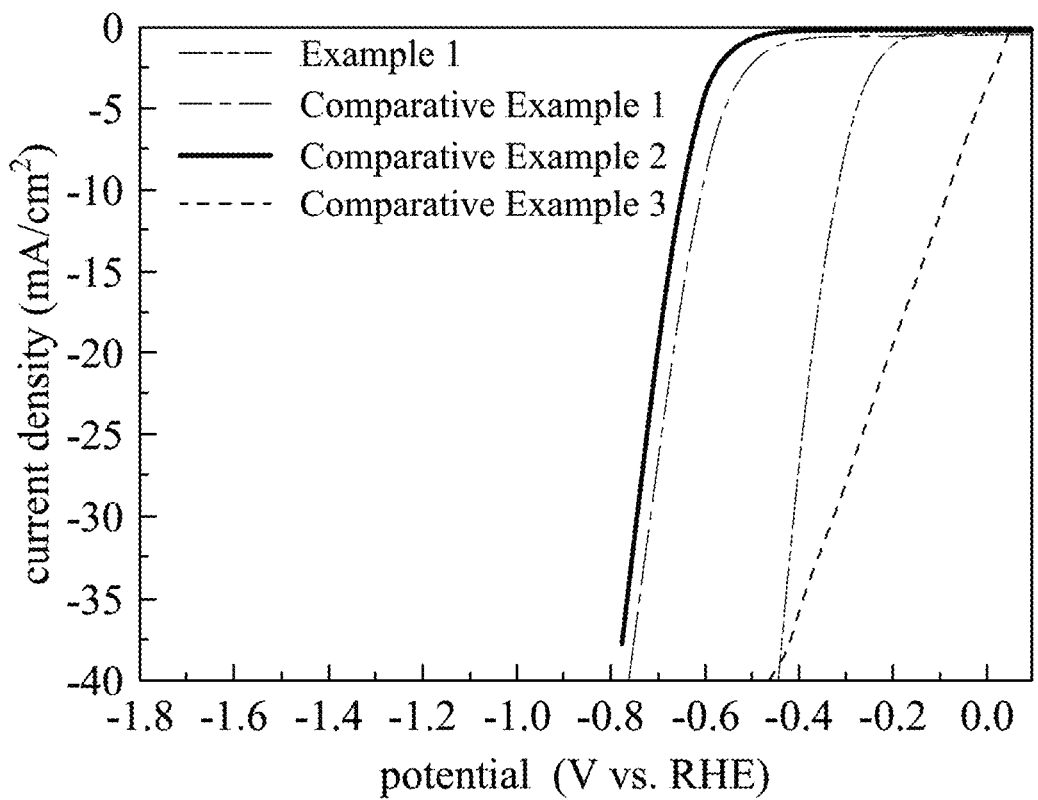
FIG. 11 is a linear sweep voltammogram of HER of Example 1 and Comparative Example 1 to Comparative Example 3.

Please refer to FIG. 11, which is a linear sweep voltammogram of HER of Example 1 and Comparative Example 1 to Comparative Example 3. As shown in FIG. 11, the HER performance of Example 1 is better than that of Comparative Example 1 and Comparative Example 2, and when the current density is 40 mA/cm$^2$, the HER performance of Example 1 is better than that of Comparative Example 3. It can be seen that Example 1 has the smaller Tafel slope, which is 110 mv/dec, so that Example 1 of the present disclosure has the better catalytic activity for hydrogen evolution reaction.

$CO_2$RR Measurement

The $CO_2$RR measurement of the present disclosure is under the saturated $CO_2$ solution condition, the catalyst of Example 1 is placed into the electrolytic cell and used as the working electrode, wherein the electrolyte is 0.5 M potassium bicarbonate ($KHCO_3$), and the scanning rate is 5 mV/s to perform the linear sweep voltage (LSV) test.

Figure 12:
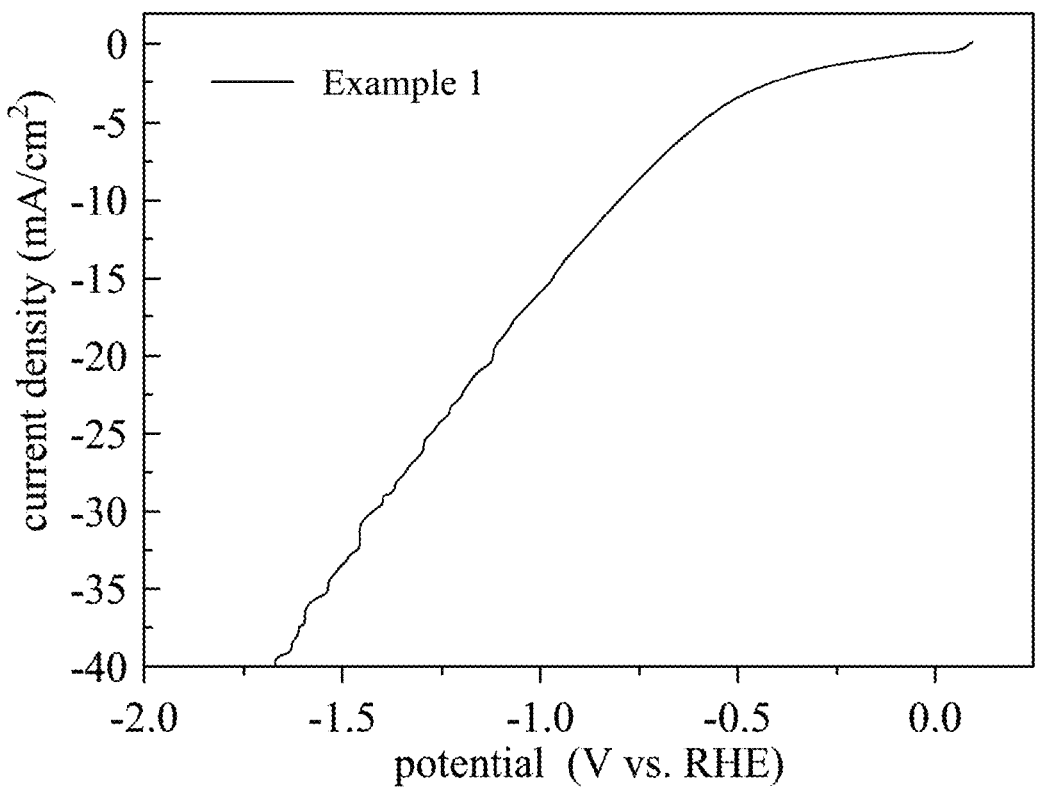
FIG. 12 is a linear sweep voltammogram of $CO_2RR$ of Example 1.

Please refer to FIG. 12, which is a linear sweep voltammogram of $CO_2$RR of Example 1. As shown in FIG. 12, the potential of Example 1 at the current density of 10 mA/cm$^2$ is –0.76 V. However, Comparative Example 3 of the noble metal does not have a better performance in the $CO_2$RR reaction, so it can be indicated that Example 1 of the present disclosure has the better catalytic activity for carbon dioxide reduction reaction.

In conclusion, the catalyst structure of the present disclosure has the advantages described bellowing. First, the nitrogen-doped carbon framework has a porous structure, which can improve the mass transfer efficiency of the metal oxide catalyst, so that the catalyst structure has more active sites to increase the catalytic effect of the catalyst. Second, the carbon nanotubes are distributed on the surface of the nitrogen-doped carbon framework, and the carbon nanotubes can increase the conductivity. Third, the layered hydroxides are coated on the surface of the nitrogen-doped carbon framework, and the layered hydroxides can improve the ion exchange rate. Therefore, the catalyst structure of the present disclosure has better catalytic effect than the traditional noble metals in the oxygen reduction reaction, the oxygen evolution reaction, the hydrogen evolution reaction and the carbon dioxide reduction reaction. It can become the multi-functional nanomaterial and can be widely used in the energy industry.

Although the present disclosure has been described in considerable detail with reference to certain embodiments thereof, other embodiments are possible.

Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A catalyst structure, comprising:
   a porous carrier, comprising:
   a nitrogen-doped carbon framework having a plurality of pores;
   a plurality of metal oxide particles, wherein the metal oxide particles are uniformly dispersed in the pores of the nitrogen-doped carbon framework; and
   a plurality of carbon nanotubes, wherein the carbon nanotubes are located on a surface of the nitrogen-doped carbon framework, and one end of each of the carbon nanotubes is connected to the surface of the nitrogen-doped carbon framework; and
   a plurality of layered hydroxides, wherein the layered hydroxides are coated on the surface of the nitrogen-doped carbon framework.

2. The catalyst structure of claim 1, wherein a size of the nitrogen-doped carbon framework is 100 nm to 5 μm.

3. The catalyst structure of claim 1, wherein the metal oxide particles are cobalt tetroxide.

4. The catalyst structure of claim 1, wherein a length of each of the carbon nanotubes is 10 nm to 2 μm.

5. The catalyst structure of claim 1, wherein a diameter of each of the carbon nanotubes is 1 nm to 30 nm.

6. The catalyst structure of claim 1, wherein a thickness of each of the layered hydroxides is 0.5 nm to 50 nm.

7. The catalyst structure of claim 1, wherein the layered hydroxides are nickel-iron layered hydroxides.

8. An electrochemical device comprising the catalyst structure of claim 1.

9. The electrochemical device of claim 8, wherein the electrochemical device is an alkaline fuel-cell, a metal-air battery or a water splitting device.

* * * * *